Figure 1:
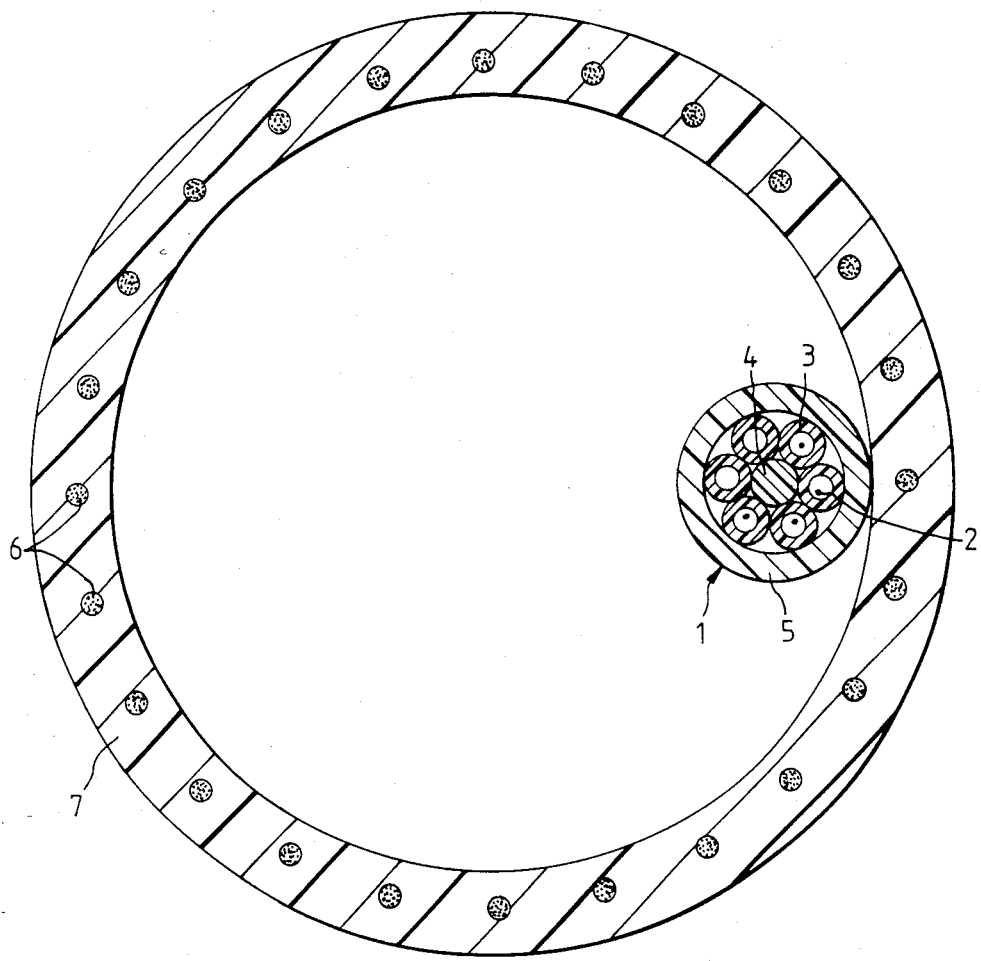

United States Patent [19]

Knipe et al.

[11] Patent Number: 4,798,443
[45] Date of Patent: Jan. 17, 1989

[54] OPTICAL CABLE

[75] Inventors: Charles D. Knipe, Rainford; Edward L. Mather, Liverpool, both of Great Britain

[73] Assignee: BICC Public Limited Company, London, Great Britain

[21] Appl. No.: 386,532

[22] Filed: Jun. 9, 1982

[30] Foreign Application Priority Data

Jun. 17, 1981 [GB] United Kingdom ............... 8118586

[51] Int. Cl.$^4$ ................................................ G02B 6/44
[52] U.S. Cl. ................................................ 350/96.23
[58] Field of Search ........................... 350/96.23, 96.24

[56] References Cited

U.S. PATENT DOCUMENTS 4,078,853  3/1978  Kempf et al. .................... 350/96.23

FOREIGN PATENT DOCUMENTS

| 2430857 | 1/1975 | Fed. Rep. of Germany ... 350/96.23 |
| 1481582 | 6/1976 | United Kingdom ............ 350/96.23 |
| 1479427 | 7/1977 | United Kingdom ............ 350/96.23 |
| 2026191 | 1/1980 | United Kingdom ............ 350/96.23 |
| 1582851 | 1/1981 | United Kingdom ............ 350/96.23 |
| 1583383 | 1/1981 | United Kingdom ............ 350/96.23 |
| 1584248 | 2/1981 | United Kingdom . |

Primary Examiner—William L. Sikes
Assistant Examiner—Akm E. Ullah
Attorney, Agent, or Firm—Thomas R. Shaffer

[57] ABSTRACT

An optical cable suitable for suspension beside an electrical railway or other location where an electric communication cable would be subjected to electrical interference comprises an optical cable element which is loosely housed in and extends helically throughout the length of an outer protective sleeve which has embedded in and at spaced positions around the sleeve a plurality of elongate non-metallic reinforcing members which extend lengthwise of the sleeve. Each reinforcing member has, in the member, undulations that serve to improve the mechanical bonding of the member within the sleeve and the flexibility of the cable. The optical cable element comprises a plurality of plastic tubes helically laid around a central non-metallic reinforcing member and surrounded by an outer sheath. In each of some of the tube is loosely housed a separate optical fibre.

19 Claims, 1 Drawing Sheet

U.S. Patent    Jan. 17, 1989    4,798,443

OPTICAL CABLE

This invention relates to optical cables for the transmission of the ultra-violet, visible and infra-red regions of the electromagnetic spectrum, which regions, for convenience, will hereinafter all be included in the generic term "light", and especially, but not exclusively, to optical cables for use in the communications field adapted for transmission of light having a wavelength within the range 0.8 to 2.1 micrometres.

It is an object of the invention to provide an improved optical cable suitable for being freely supported in long lengths from poles or other upstanding supports spaced along and beside an electric railway or other location where an electric communication cable would be subjected to electrical interference.

According to the invention, the improved optical cable comprises an optical cable element comprising a plurality of separately formed tubes of rubber or plastics material in at least one of which is or are loosely housed at least one separate optical fibre and/or at least one optical bundle as hereinafter defined and, surrounding the tubes, an outer protective sheath; and, surrounding the optical cable element, an outer protective sleeve which has embedded in the sleeve at least one layer of circumferentially spaced elongate non-metallic reinforcing members which extend substantially lengthwise of the sleeve, each of the reinforcing members having, in the member, undulations that serve to improve the mechanical bonding of the member within the sleeve and the flexibility of the cable, wherein the overall diameter of the optical cable element is substantially than the internal diameter of the sleeve and wherein the optical cable element is loosely housed within and extends helically throughout substantially the whole of the length of the sleeve and is in continuous or discontinuous contact with the internal surface of the sleeve.

Preferably, the overall diameter of the optical cable element is less than half of the internal diameter of the sleeve and preferably, also, the helically extending optical cable element has a substantially constant length of lay.

By the expression "optical bundle" as used herein is meant a group of optical fibres or a group of fibres including at least one optical fibre and at least one non-optical reinforcing fibre or other reinforcing elongate member.

The elongate non-metallic reinforcing members having undulations therein preferably each comprise a bunch of compacted yarns of glass fibre or other inorganic reinforcing material. Preferably each undulating elongate non-metallic reinforcing member extends substantially parallel to the axis of the cable but, in some circumstances, each member may extend helically around the axis of the cable, if desired the direction of lay of the helically extending undulating non-metallic reinforcing member being reversed at spaced positions along the length of the cable.

Where the reinforcing members are arranged in two or more layers, the members in each layer may either extend substantially parallel to the axis of the cable or they may extend helically around the axis of the cable. In the latter case, preferably the helically extending reinforcing members of adjacent layers are of opposite hand. The radial distance between reinforcing members of adjacent layers is preferably not less than the diameter of a reinforcing member.

The outer sleeve of the optical cable is preferably an extruded tube of rubber or plastics material and the undulating elongate non-metallic reinforcing members embedded therein are preferably at uniformly spaced positions around the sleeve. The outer protective sheath of the optical cable element is preferably also an extruded tube of rubber or plastics material.

Where the undulating elongate non-metallic reinforcing members are bunches of compacted yarns of glass fibre or of other inorganic reinforcing material, preferably these yarns are coated with a form of starch.

Each bunch may consist of elements of glass fibre or of other inorganic material of the same kind and/or thickness or it may consist of a combination of elements of different kinds from one another, for example single or double yarns, and/or of different thicknesses from one another.

The mutual spacing between adjacent elongate non-metallic reinforcing members with undulations therein is preferably not less than the diameter of a reinforcing member and the radial distance of each member of the layer or innermost layer of reinforcing members from the radially inner surface of the sleeve is preferably, also, not less than the diameter of a reinforcing member.

Where the elongate non-metallic reinforcing members with undulations therein are bunches of compacted yarns of glass fibre or of other inorganic reinforcing material, it is preferred to manufacture the outer sleeve of the optical cable by the method described and claimed in U.K. Pat. No: 1413674. In this method, the amplitude of the undulation determines the maximum permissible diameter of the bunches in the cable for optimum results. The diameter of the bunches may be greater, the greater the amplitude of the undulations.

Preferably, the outer protective sleeve is extruded over and is bonded to a tubular lining formed of a longitudinally applied, transversely folded tape. For reasons of weight, the tape forming the tubular lining is preferably of paper, but in some circumstances it may be of plastics material or, where electrical interference is not of first priority, of a metal or metal alloy; in the latter case, the outer surface of the metal tape may carry a coating of plastics material to which the material of the outer sleeve will readily bond.

Suitable materials of which the outer sleeve of the cable and the outer protective sheath of the optical cable element may be made include polyethylene, for example high density polyethylene, a modified polyethylene such as ethylene vinyl acetate, or hard polyolefin, such as polypropylene or a modified polypropylene, for example propylene ethylene copolymer.

The tubes of the optical cable element are preferably arranged helically in one or more than one layer around an elongate non-metallic central core, which itself may be a tube of rubber or plastics material in which is or are loosely housed at least one separate optical fibre and/or at least one optical bundle. Each tube of the optical cable element is preferably of substantially circular cross-section. Where the elongate nonmetallic central core of the optical cable element is not a tube loosely housing a separate optical fibre and/or optical bundle, it may be an elongate non-metallic flexible reinforcing member.

The or each tube in which at least one separate optical fibre and/or at least one optical bundle is loosely housed may be substantially filled throughout its length with petroleum jelly or other water-impermeable medium of a grease-like nature.

The combination of the tensile properties of the embedded elongate non-metallic reinforcing members and the undulations in these reinforcing members gives the outer protective sleeve an acceptable elongation at break; in the case where the reinforcing members are of glass fibre, the elongation at break is approximately 2%. Loose housing of the optical fibres in the tubes of the optical cable element permits an elongation of the optical cable element of approximately 0.7% before the onset of strain to the optical fibres. By arranging for the optical cable element to extend helically within the bore of the outer protective sleeve and to bear against the internal surface of the sleeve, by appropriate selection of the lay length and overall diameter of the optical cable element and of the internal diameter of the outer protective sleeve, it is possible to provide for an extension of the optical cable of at least 1.3% before any strain is imparted to the optical cable element, thereby permitting a total cable elongation of approximately 2% before any strain is imparted to an optical fibre.

Figure 2:
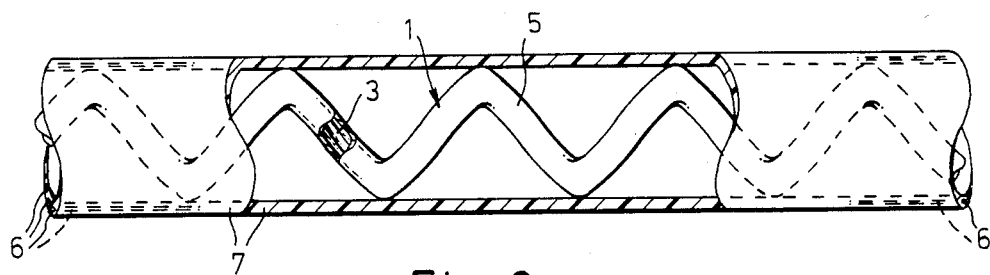

Additionally, fittings can be secured to the reinforced outer protective sleeve to enable the optical cable to be freely supported in long lengths with negligible risk of damage to the cable or to any of its component parts. The invention is further illustrated by a description, by way of example, of a preferred optical cable with reference to the accompanying drawings in which:

FIG. 1 is a diagrammatic transverse section, in enlarged scale, of a cable of this invention; and FIG. 2 is a diagrammatic elevation of a fragment in cable showing the helical arrangement of the optical cable element within the sleeve.

Referring to the drawing, the optical cable comprises an optical cable element 1 having an overall diameter of 6 mm and comprising six tubes 3 of extruded polyethylene terephthalate in each of four of which is loosely housed one separate optical fibre 2. The six tubes 3 are arranged helically around a central rod 4 of polyethylene terephthalate. The assembly is surrounded by an extruded outer protective sheath 5 of polyethylene. The optical cable element 1 is loosely housed in an outer sleeve 7 of polyethylene which has an internal diameter of 24 mm and a wall thickness of 2.6 mm and in which are embedded at spaced positions around the sleeve twenty four elongate reinforcing members 6. Each reinforcing member 6 comprises a bundle of compacted yarns of glass fibre having, in the bundle, radially extending undulations that serve to improve the mechanical bonding of the bunch within the sleeve 7 and the flexibility of the cable. The optical cable element 1 extends helically along the bore of and around the axis of the sleeve 7 with a substantially constant length of lay and is in discontinuous contact with the internal surface of the sleeve.

Limited relative movement between each optical fibre 2 and the tube 3 in which it is loosely housed and between the optical cable element 1 and the sleeve 7 can take place when the cable is flexed.

The optical cable can be used as a self-supporting aerial cable because the strain that would otherwise be imparted to each optical fibre 2 when the optical cable is suspended is substantially eliminated by the embedded radially undulating reinforcing members 6, the extensibility of the optical cable element within the sleeve and the fact that the optical fibres are loosely housed in some of the tubes 3. The optical cable is especially suitable for use alongside an electric railway or in other locations where an electric communication cable could be subjected to electrical interference.

What we claim as our invention is:

1. An optical cable adapted to be freely supported in long length from spaced supports along a location subject to electrical interference, comprising an optical cable element comprising a plurality of separately formed tubes of plastics material in at least one of which is loosely housed at least one optical fibre and, surrounding the tubes, an outer protective sheath; and, loosely surrounding the optical cable element, an outer protective sleeve which has an inner diameter substantially greater than the overall diameter of the optical cable element and which has embedded in the sleeve at least one layer of circumferentially spaced elongate non-metallic reinforcing members which extend substantially lengthwise of the sleeve, each of the reinforcing members having, in the member, undulations that serve to improve the mechanical bonding of the member within the sleeve and the flexibility of the cable, wherein the optical cable element comprises a plurality of separately formed tubes of plastics material in at least one of which is loosely housed at least one optical fibre and, surrounding the tubes, an outer protective sheath and wherein the optical cable element is loosely housed within and extends helically throughout substantially the whole of the length of the sleeve and is contiguous with the internal surface of the sleeve at least spaced positions along the length of the sleeve.

2. An optical cable as claimed in claim 1, wherein the overall diameter of the optical cable element is less than half of the internal diameter of the sleeve.

3. An optical cable, as claimed in claim 1, wherein the helically extending optical cable element has a substantially constant length of lay.

4. An optical cable as claimed in claim 1, wherein the elongate non-metallic reinforcing members each comprise a bunch of compacted yarns of glass fibre.

5. An optical cable as claimed in claim 4, wherein the compacted yarns of each elongate non-metallic reinforcing member are coated with a form of starch.

6. An optical cable as claimed in claim 4 or 5, wherein the bunch of compacted yarns of each elongate non-metallic reinforcing member consists of a combination of elements of different kinds from one another.

7. An optical cable as claimed in claim 1, wherein the mutual spacing between adjacent elongate non-metallic reinforcing members is not less than the diameter of a reinforcing member.

8. An optical cable as claimed in claim 1, wherein the radial distance of each elongate non-metallic reinforcing member of the layer or innermost layer of reinforcing members from the radially inner surface of the sleeve is not less than the diameter of a reinforcing member.

9. An optical cable as claimed in claim 1, wherein each undulating elongate non-metallic reinforcing member extends helically around the axis of the cable.

10. An optical cable as claimed in claim 1, wherein the direction of lay of each helically extending non-metallic reinforcing member is reversed at spaced positions along the length of the cable.

11. An optical cable as claimed in claim 1, in which the undulating elongate non-metallic reinforcing members are arranged in at least two layers and each member extends helically around the axis of the cable, wherein the helically extending reinforcing members of adjacent layers are of opposite hand.

12. An optical cable as claimed in claim 1, wherein the outer sleeve of the optical cable is an extruded tube of plastics material.

13. An optical cable as claimed in claim 11, wherein the extruded outer protective tube is bonded to a tubular lining formed of a longitudinally applied, transversely folded tape.

14. An optical cable as claimed in claim 13, wherein the tape forming the tubular lining is of plastics material.

15. An optical cable as claimed in claim 1, wherein the elongate non-metallic reinforcing members are embedded in the outer sleeve at uniformly spaced positions around the sleeve.

16. An optical cable as claimed in claim 1, wherein the tubes of the optical cable element are arranged helically in at least one layer around an elongate non-metallic central core.

17. An optical cable as claimed in claim 16, wherein the elongate non-metallic central core of the optical cable element is a tube of plastics material in which is loosely housed at least one optical fibre.

18. An optical cable as claimed in claim 16, wherein the elongate non-metallic central core of the optical cable element is an elongate non-metallic flexible reinforcing member.

19. An optical cable as claimed in any one of claims 1 or 16, wherein the or each tube of the optical cable element in which at least one optical fibre is loosely housed is substantially filled throughout its length with water-impermeable medium of a grease-like nature.

* * * * *

UNITED STATES PATENT AND TRADEMARK OFFICE
CERTIFICATE OF CORRECTION

PATENT NO. : 4,798,443
DATED : January 17, 1989
INVENTOR(S) : Charles D. Knipe and Edward L. Mather It is certified that error appears in the above-identified patent and that said Letters Patent is hereby corrected as shown below:

Column 1, line 33, after "substantially" insert --less--.

Column 2, line 59, change "nonmetallic" to --non-metallic--.

Signed and Sealed this

Ninth Day of January, 1990

Attest:

JEFFREY M. SAMUELS

*Attesting Officer*      *Acting Commissioner of Patents and Trademarks*